Figure 1:
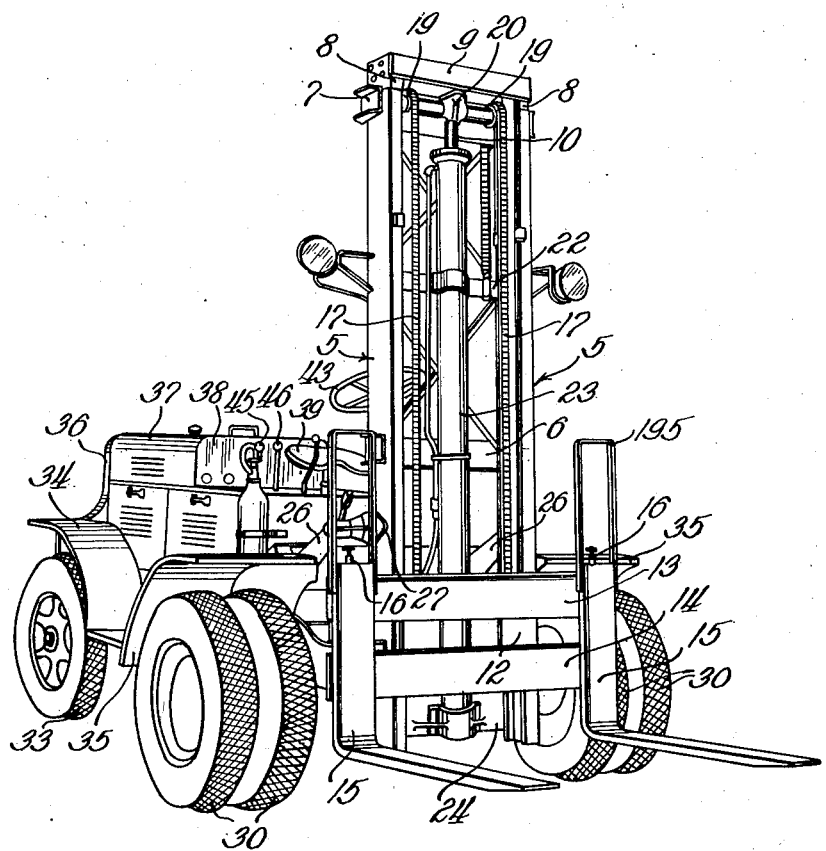

Aug. 7, 1945.　　E. J. DUNHAM ET AL　　2,381,729
INDUSTRIAL TRUCK
Filed July 30, 1943　　12 Sheets-Sheet 1

Inventors:
Elmer J. Dunham
Kenneth E. Mulvany
BY Walter E. Schirmer
Atty.

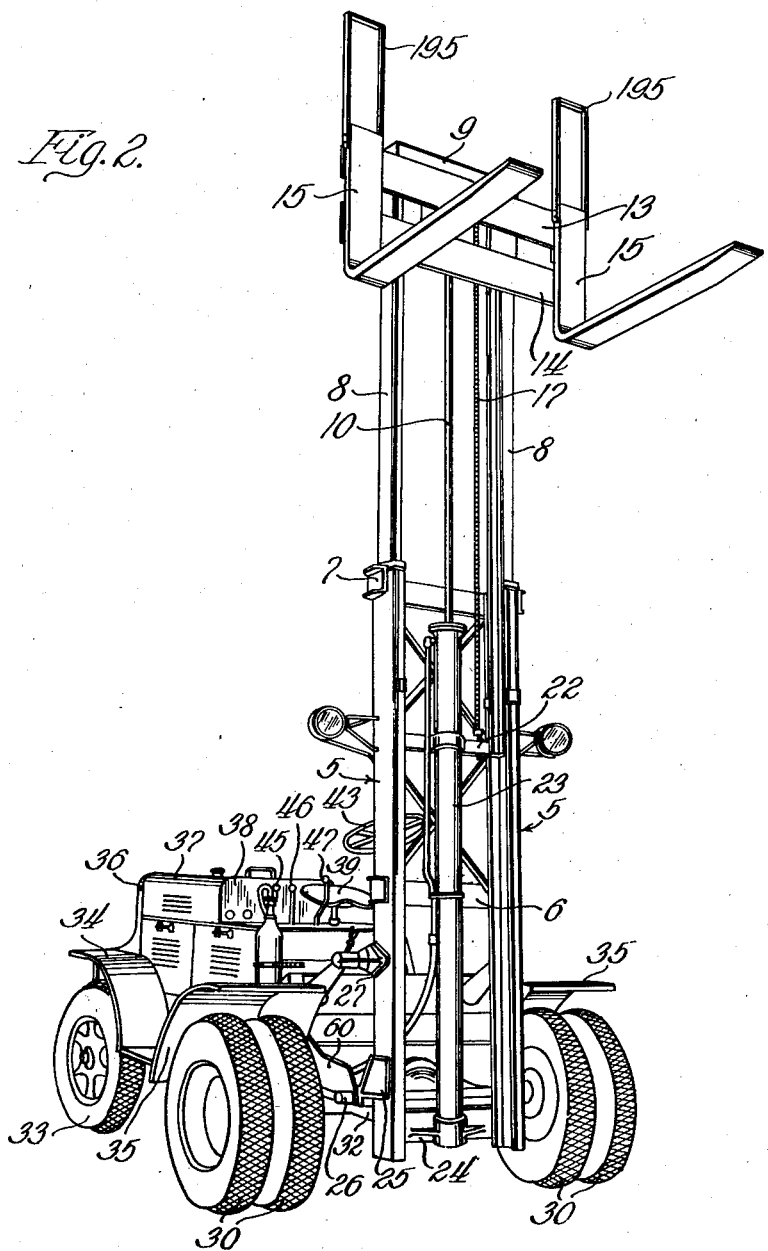

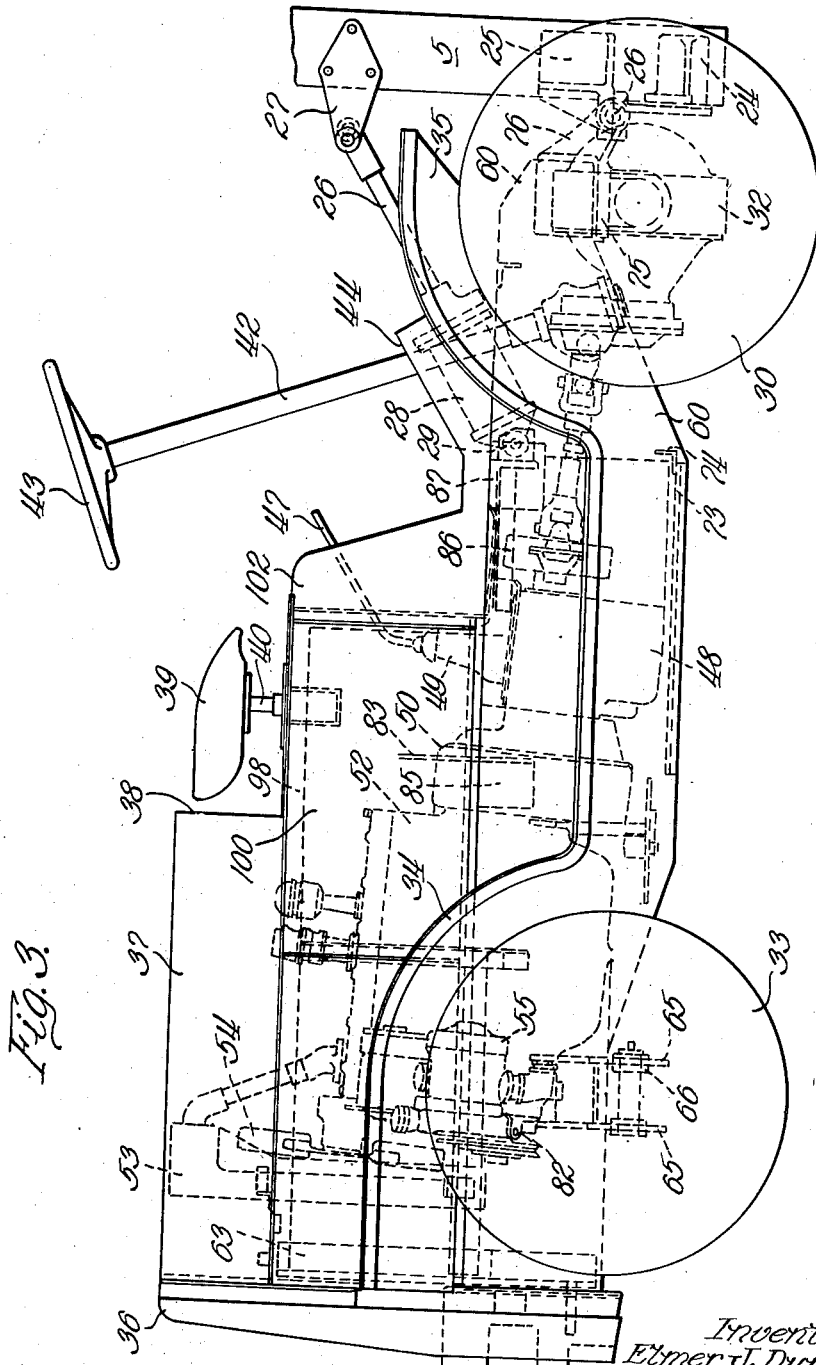

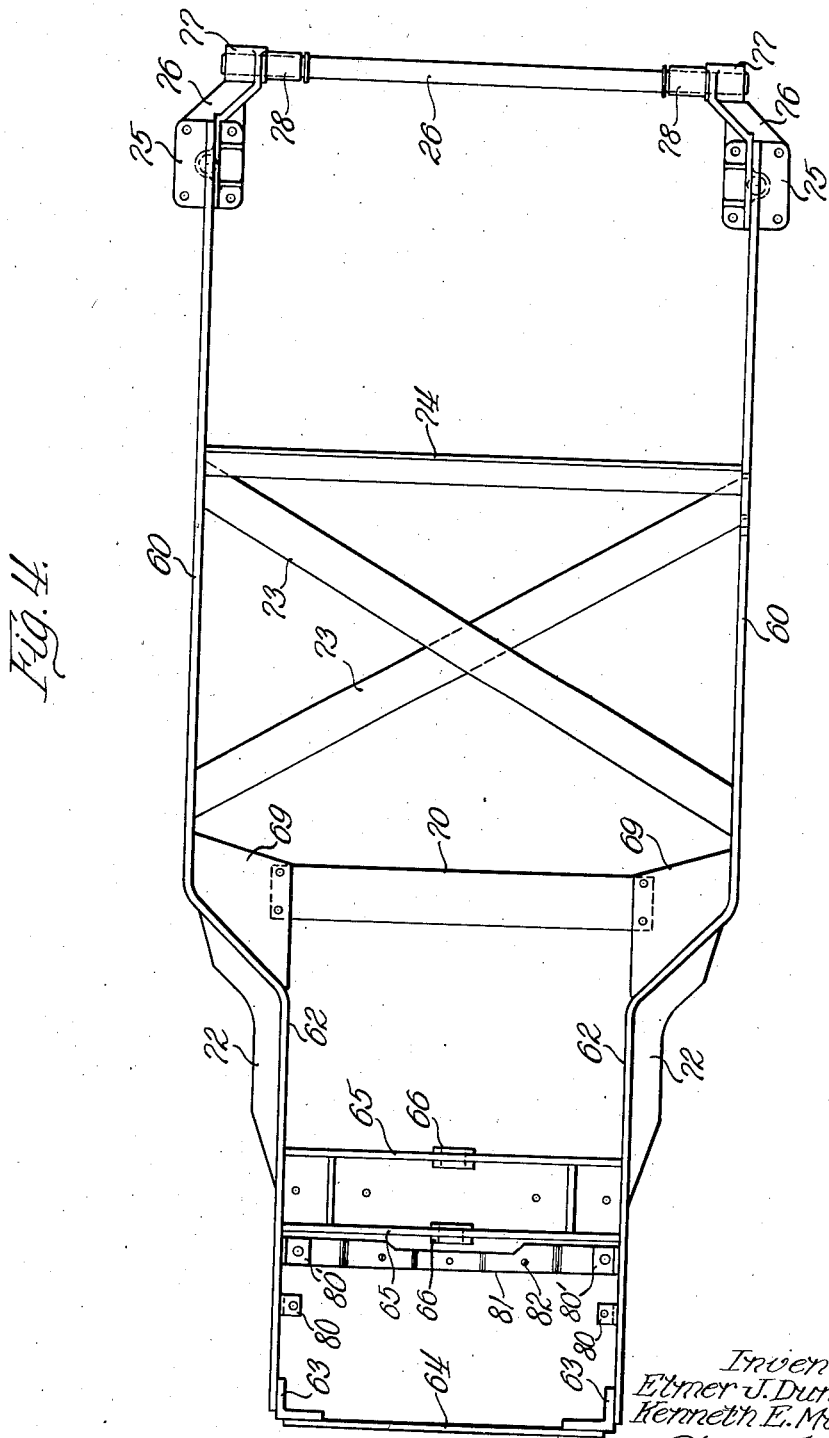

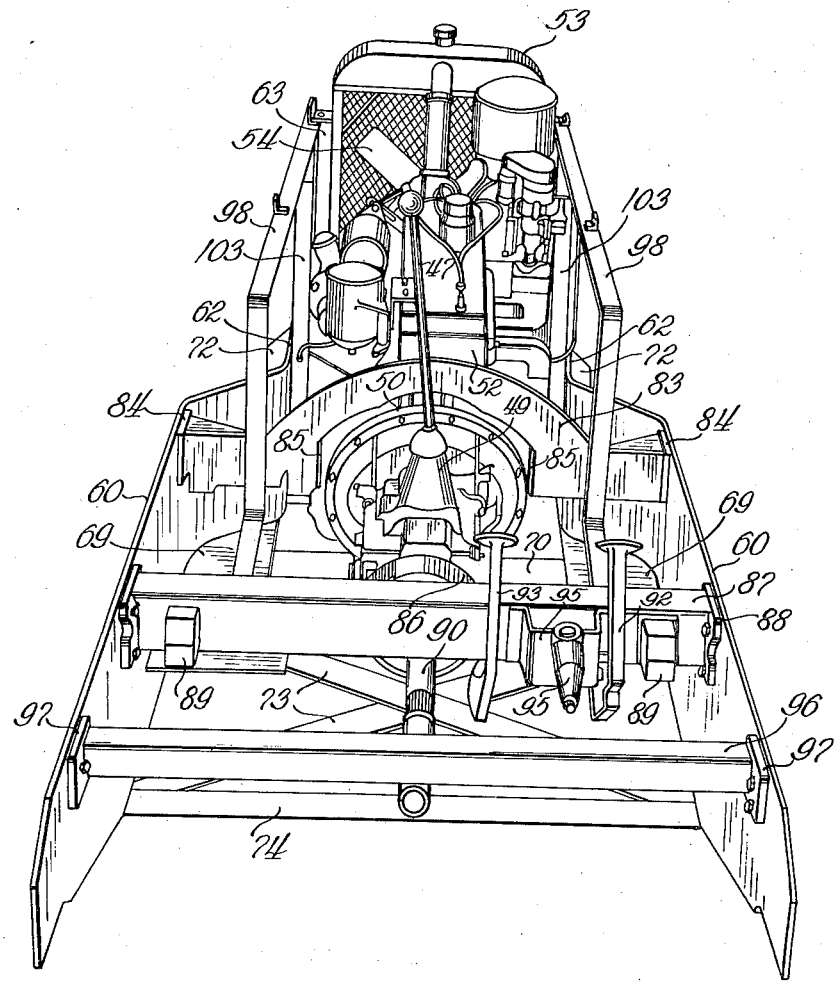

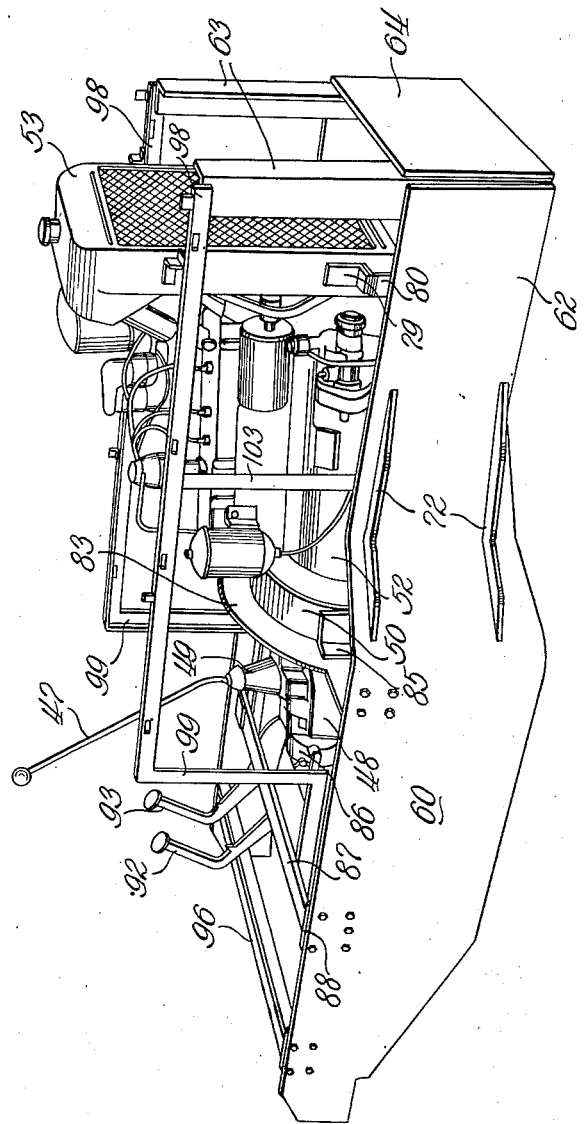

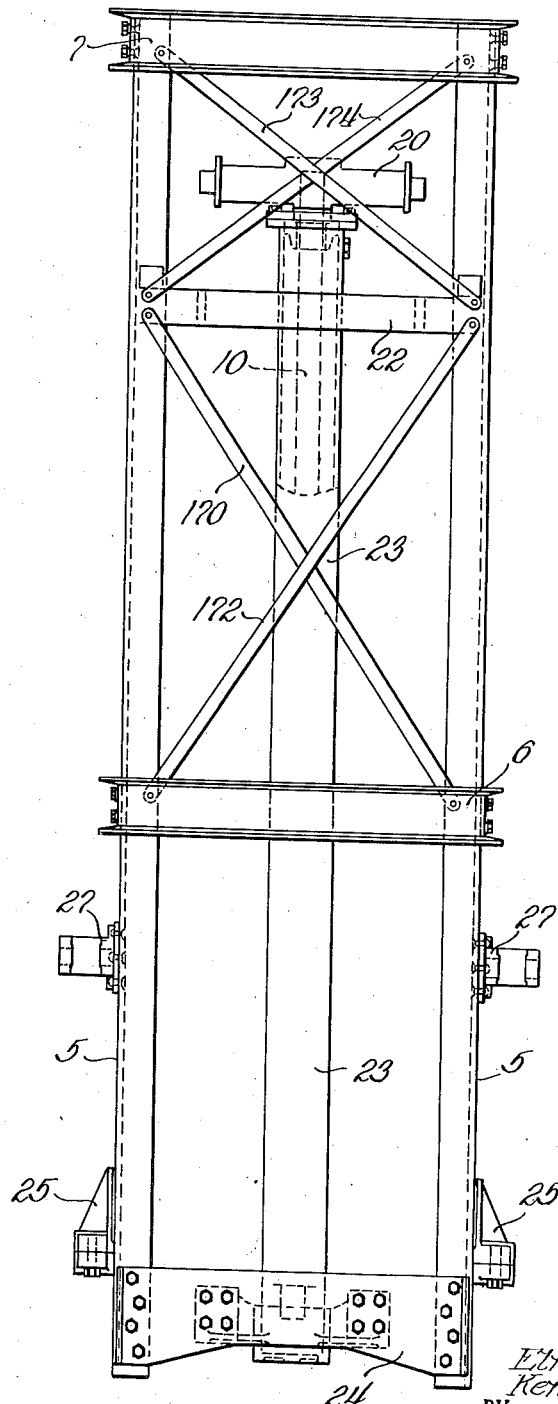

Aug. 7, 1945. E. J. DUNHAM ET AL 2,381,729
INDUSTRIAL TRUCK
Filed July 30, 1943 12 Sheets-Sheet 8

Inventors:
Elmer J. Dunham
Kenneth E. Mulvany
BY Walter E. Schirmer
Atty.

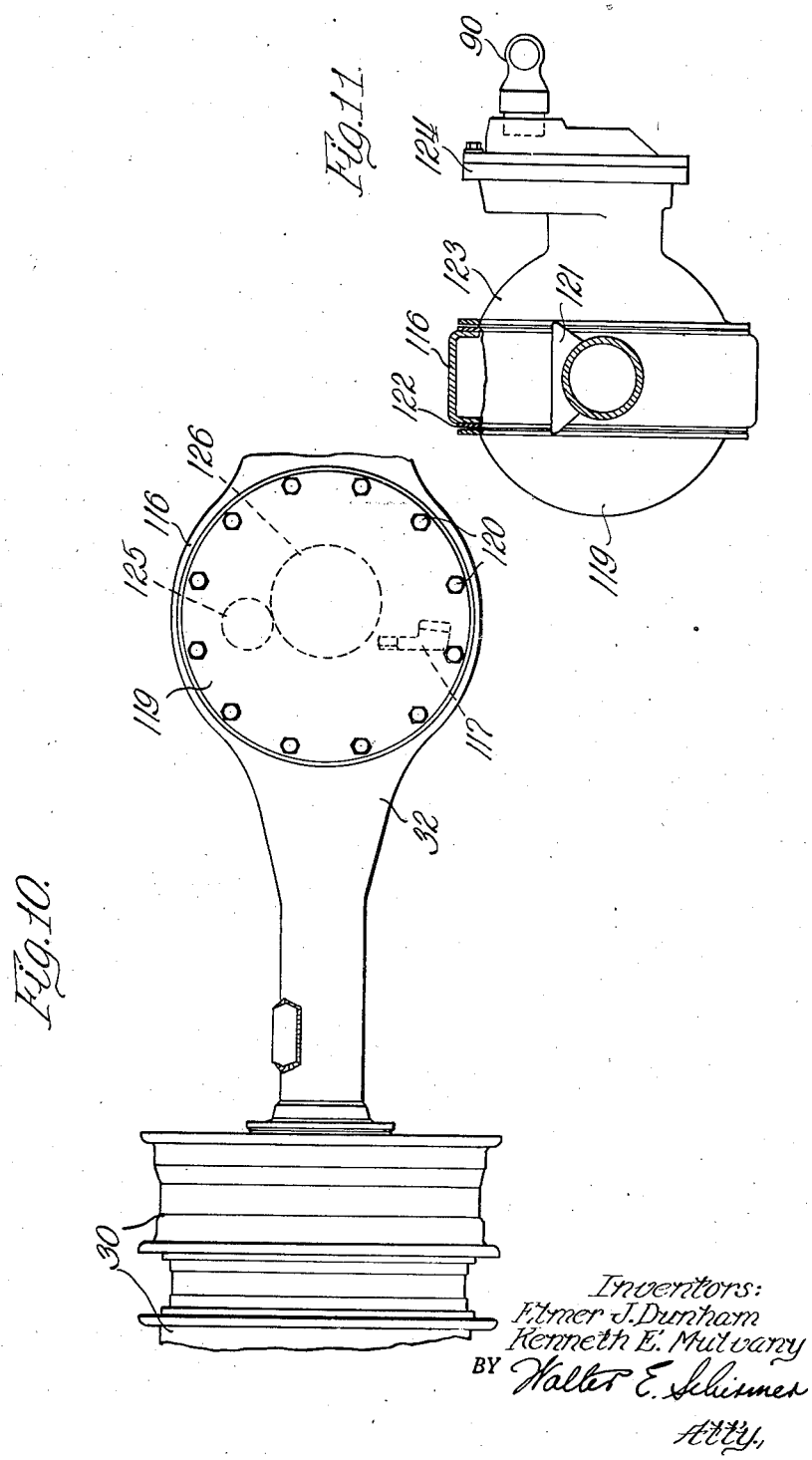

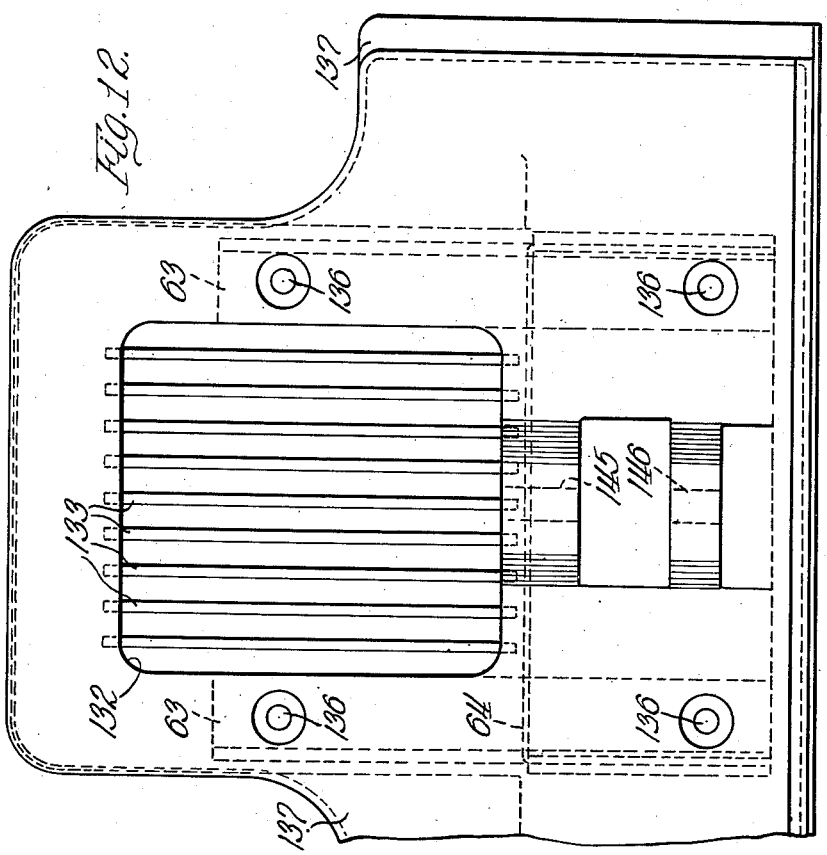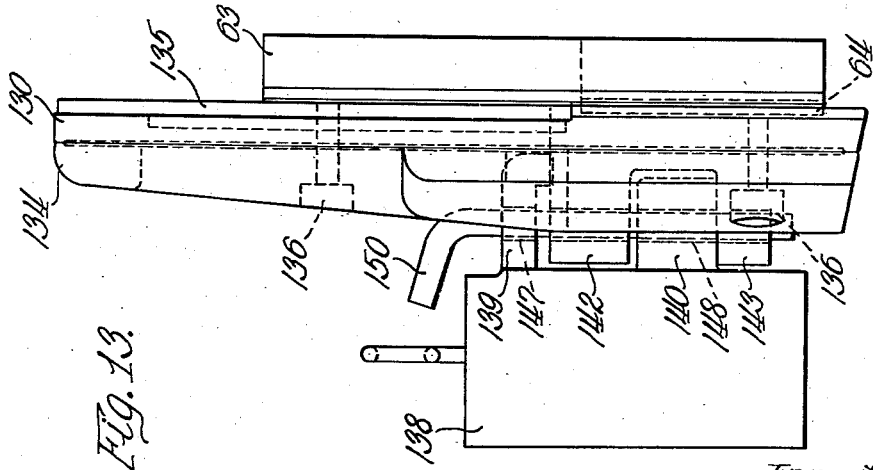

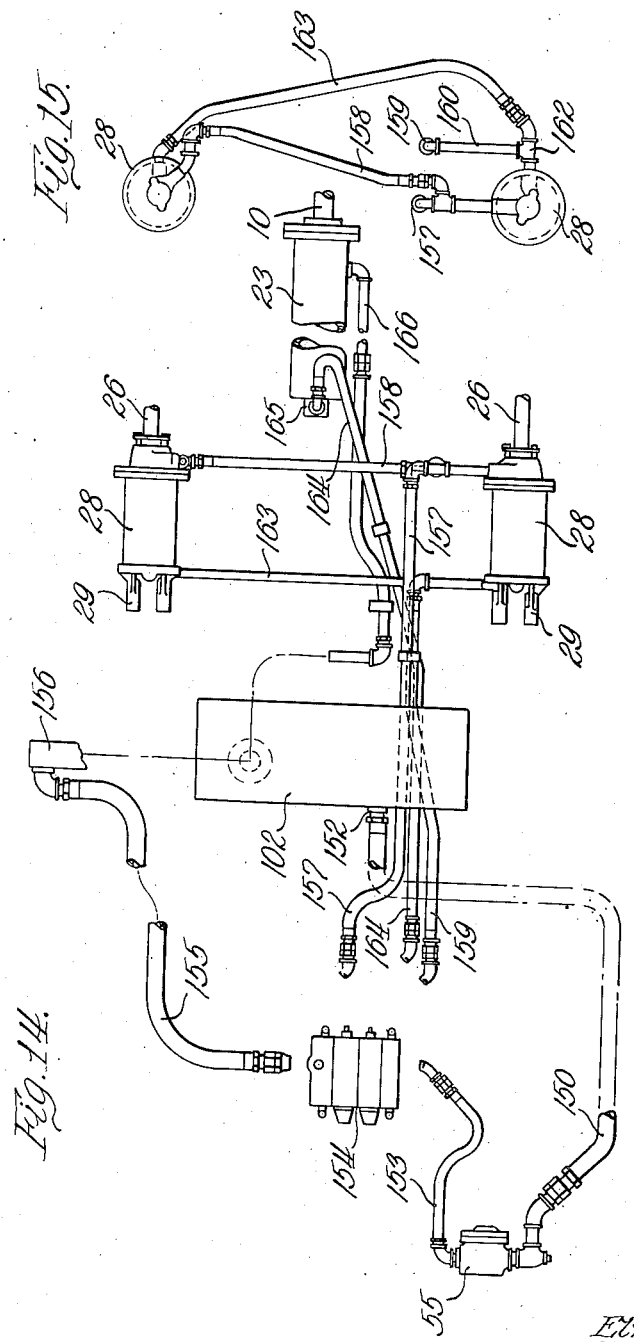

Aug. 7, 1945.  E. J. DUNHAM ET AL  2,381,729
INDUSTRIAL TRUCK
Filed July 30, 1943   12 Sheets-Sheet 12
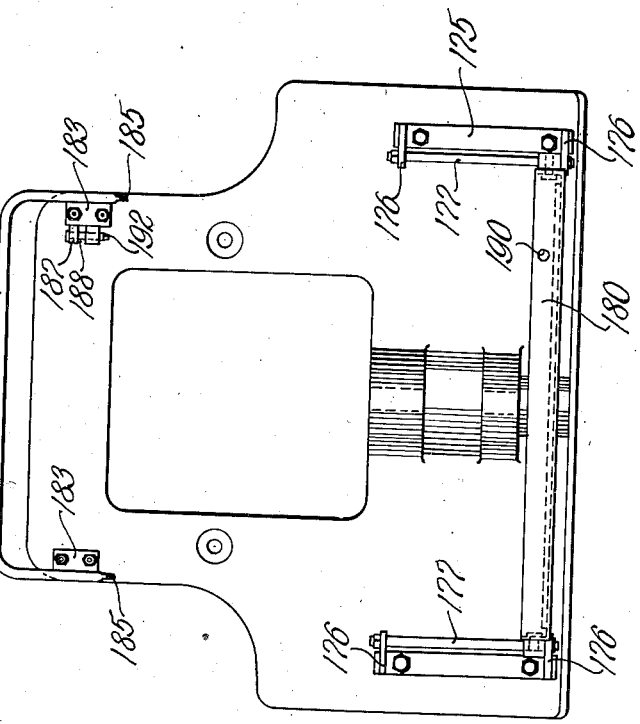
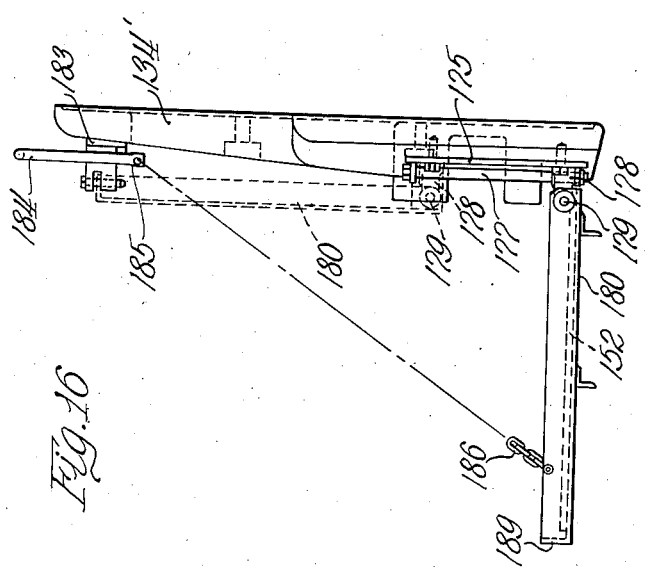
INVENTORS
Elmer J. Dunham
Kenneth E. Mulvany
BY Walter E. Schirmer
Atty.

Patented Aug. 7, 1945

2,381,729

UNITED STATES PATENT OFFICE 2,381,729

INDUSTRIAL TRUCK

Elmer J. Dunham and Kenneth E. Mulvany, Battle Creek, Mich., assignors to Clark Equipment Company, Buchanan, Mich., a corporation of Michigan Application July 30, 1943, Serial No. 496,807

13 Claims. (Cl. 214—113)

This invention relates to industrial trucks and more particularly is concerned with the provision of an industrial truck of the fork type, partly designed for use in yards, landing fields, and the like for loading and unloading cargo or transport planes, also in yards and loading areas in and around industrial and mercantile establishments.

With the advent of larger and larger aircraft for the transportation of air freight and supplies, there has come an increasing demand for mechanical handling equipment capable of loading and unloading such planes through doorways or openings located in the fuselage of the plane, usually at a considerable height above ground level.

The conventional type of industrial truck now manufactured is not capable of use for this purpose, since it normally does not have a sufficient lifting height to reach to the desired level for introducing material into the door of the fuselage, nor does it have sufficient lateral stability to accommodate its movement over the surface of landing fields and adjacent terrain.

In addition, such trucks are normally provided with solid rubber tires and with little or no road clearance which makes them undesirable from a practical standpoint for operation in this field.

The present invention contemplates an industrial truck peculiarly adaptable to this service which is of compact design and has sufficient lateral and longitudinal stability so that it can be operated over the terrain on which such a truck must work without any danger of tipping over or up-ending.

Another feature of the present design is the provision of a telescopic type mast or upright assembly at one end of the truck provided with a load carriage capable of being extended to substantial height in order to reach the fuselage level of the larger cargo and transport planes.

Still another feature of the present invention resides in providing the truck with standard pneumatic tires which are interchangeable on both the steering and driving axles in conjunction with a design which provides a sufficient ground clearance for the truck to accommodate its use on landing strips. In this connection the basic construction of the truck contemplates a three-point suspension system of the frame or chassis upon the ground, which provides for additional stability and also allows operation of the truck at fairly high speed over rough terrain.

The operating mechanism of the truck generally consists of a gas-powered engine in conjunction with normal type of transmission and drive axle, such as is used in automotive truck construction. The control of the lifting forks as well as the forward and rearward control for controlling of the vertical masts is by hydraulic means operated from a fluid pump driven by the engine and so arranged as to be under the ready control of the operator, whereby the mast may be tilted at the same time as the load is being raised vertically.

Another feature of the present invention is the provision of a frame or chassis construction which consists of plate members and simple structural shapes and relatively few formed parts.

Still another object of the present invention is to design such a truck in which the wheels, drive and steering axles, transmissions, and similar parts are all of conventional automotive design, allowing them to be purchased at relatively lower cost because of production facilities available and also simplifying the job of maintenance and repair.

The truck is so designed that the engine and transmission form a rigid unit supported in the frame, while the frame itself is rigidly mounted at one end on the axle housing of the drive axle and it is pivotally mounted at the opposite end on the steering axle eliminating the use of springs or other resilient means for supporting the chassis upon the axle.

By the provision of a standard type automotive axle, a dual wheel pneumatic tired construction can be provided at the ends of the housing arms, thereby providing greatly increased lateral stability as well as increased tractive effort.

Other specifications and advantages of the present invention will appear more fully from the following detailed description which, taken in connection with the accompanying drawings, will disclose to those skilled in the art the particular construction and operation of a preferred form of the present invention.

Figure 9:
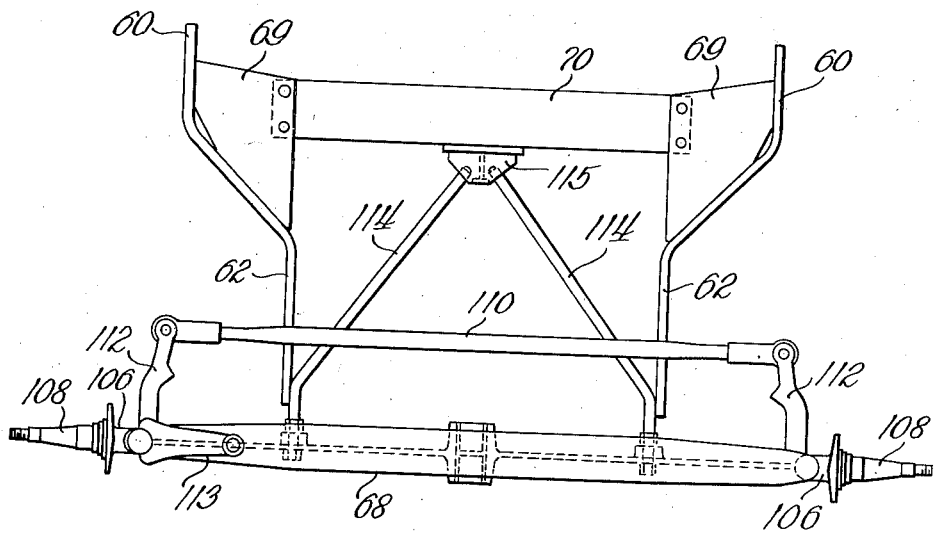
Figure 8:
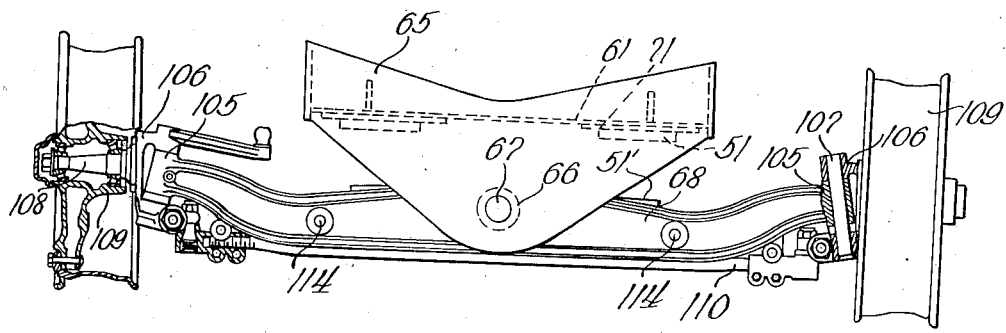

In the drawings, Figure 1 is a front perspective view of the truck with the load supporting mechanism in lowered position. Figure 2 is a corresponding view of the truck with the lifting forks in elevated position. Figure 3 is a side elevational view of the truck showing the relative arrangement of the power unit and associated parts. Figure 4 is a top plan view of the basic chassis construction for the truck. Figure 5 is an end perspective view of the truck chassis with the power unit and transmission assembled therein. Figure 6 is a side perspective view of the construction shown in Figure 5. Figure 7 is a rear elevational view of the vertical mast or upright construction. Figure 8 is an elevational view partly in section of the steering axle construction showing the method of mounting the same on the truck chassis. Figure 9 is a plan view of the construction shown in Figure 8. Figure 10 is a partial view of the drive axle assembly showing the dual wheeled mounting therefor. Figure 11 is an elevational view of the axle shown in Figure 10 and the drive connection thereto. Figure 12 is an elevational view of the counterweight assembly and grill construction. Figure 13 is a side elevational view of the construction shown in Figure 12, including a modified form of counterweight assembly. Figure 14 is a somewhat diagrammatic view of the hydraulic control system for the lifting and tilting means. Figure 15 is a detailed view of the connection to the tilt cylinders. Figure 16 is a side elevational view of a modified counterweight construction. Figure 17 is a front elevational view of the structure shown in Figure 16.

Referring now in detail to the drawings, the truck illustrated in Figures 1 and 2 is in general of the same design as that shown in United States patent to E. J. Dunham, #2,256,314 of September 16, 1941, but modified to an extent suitable to accommodate it for the purposes above designated.

The truck consists of a vertical mast or upright assembly 5, the details of which are shown more in detail in Figure 7, but which in general comprises two channel-shaped upright members tied together by means of laterally extending reinforcing members 6 and 7 and carrying therein secondary channel-shaped upright members 8, which at the upper ends are connected to a cross head 9 carried at the upper end of a telescopic piston rod 10. The inner channel members are arranged for sliding movement in the outer channel members 5 as clearly shown in Figure 2 and are adapted to have guided therein a suitable carriage comprising a plate 12 which carries on its forward surface laterally extending plate members 13 and 14, the plate members 13 and 14 in turn being provided with suitable means for mounting thereon the forwardly projecting load supporting fingers 15, which are arranged for lateral spacing on the plates 13 and 14 by means of the adjustable locating pins 16.

The forks 15 at their forward ends are chisel-shaped so that they can be lowered to ground level and moved under any desired load supported on a pallet or a skid. When the load has been received on the forks, then the forks are moved vertically relative to the inner uprights 8 by means of chains 17 connected at one end to the carriage 12 and then trained over suitable sprockets 19 carried by the extending arms of a bracket 20 mounted at the upper end of the piston 10. The opposite ends of the chains are anchored to a cross member 22 extending between the shaft uprights 5. This cross member also forms a support for the hydraulic cylinder 23 which at its lower end is suitably supported in a cross member 24 carried between the uprights 5. Control of the raising and lowering of the fork mechanism is through a fluid circuit connected to the cylinder 23 for moving the piston longitudinally of the piston. As shown in Figure 3, the uprights 5, as shown at their lower ends are provided with brackets 25 which provide pivotal support on a cross shaft 26 carried by the forward end of the chassis, whereby the uprights may be tilted either forwardly or rearwardly about this pivotal support by means of piston arms 26 suitably connected to brackets 27 carried by uprights 5 above the point of pivotal support, and controlled through tilt cylinders 28 pivotally mounted at their rear ends as at 29 to the chassis of the vehicle.

The forward end of the vehicle is supported on the dual pneumatic tires 30 carried at opposite ends of a transverse drive axle assembly, including the axle housing 32 which intermediate its ends is enlarged to receive a conventional type of differential and will be described more in detail hereinafter. The rear of the vehicle is supported on a steering axle, including the pneumatic tires 33 mounted for steering movement on a transverse axle which in turn is pivotally mounted on its center to the chassis of the truck as shown in detail in Figures 8 and 9.

Suitable fenders 34 are provided over the steering wheels and fenders 35 are provided over the driving wheels 30 which fenders are required in the use of the truck in the open.

At the rear end of the truck, there is provided a suitable counterweight construction indicated at 36, which will be described more in detail in connection with Figures 12 and 13.

Forwardly of the counterweight 36, there is provided a hood 37 enclosing the engine and terminating intermediate the ends of the vehicle in a vertical face portion 38, forming an instrument panel upon which is mounted the usual instruments for vehicles of this type. Forwardly of the instrument panel 38, there is provided at one side of the vehicle an operator's seat 39, suitably supported by the post 40 for resilient mounting in the frame of the vehicle. Extending vertically upwardly and rearwardly is the steering post 42 carrying a conventional type of steering wheel 43. This post projects through the floor board 44 which encloses the tilt cylinders 28. Adjacent the driver's seat and to the right thereof are the two control levers 45 and 46 which respectively control the raising and lowering of the load fingers and forward and rearward tilting of the upright assembly. Forwardly of the control levers 45 and 46 and extending within easy reach of the operator's hand is the gear shift control 47 for selecting various speed ratios in the transmission 48 shown in Figure 3, the lever extending out through a suitable control tower 49 mounted on the top of the transmission. The transmission itself is rigidly secured to the flywheel housing 50 of the engine 52, this engine being of the usual industrial automotive type and including the conventional type of radiator 53, fan 54, and also being provided with a fluid pump 55, used for developing pressure in the hydraulic circuit. The pump operates whenever the engine is running but delivers pressure to the tilt cylinders or lift cylinders only in connection with the operation of the levers 45 and 46.

Considering now the frame of the vehicle shown in Figures 4 to 6, inclusive, this frame comprises two side plate members 60 which adjacent the rear end of the truck converge inwardly as indicated at 62 and terminate in vertically extending angle members 63 rigidly connected together by the transverse plate 64.

Intermediate the plate 64 and the point of convergence of the side plate 60, there is provided a downwardly arched plate member 65, which is provided with aligned bosses 66 adapted to receive the transverse pivot pin 67, by which the steering axle member 68 is pivotally mounted to the chassis. Between the two plates 65 there is provided a transverse plate 61, welded or otherwise secured to the adjacent faces of plates 65. The plate 61 is adapted to carry brackets 71 having rubber bumper blocks 51 secured thereto.

The blocks 51 cooperate with pads 51' formed on the axle 68 to dampen and absorb shocks imparted thereto by the axle pads when the axle is abruptly rocked about its pivot 67.

Suitable reinforcing webs or plates 69 are provided at the points where the frame plates 60 converge inwardly and are tied together by a transverse plate member 70 extending laterally thereacross. Also reinforcing webs 72 are provided on the outer surface of the frame plate 60 through the angular portion of these plates for reinforcing purposes and also for supporting the running board and fenders of the vehicle. These reinforcements are indicated at 72 and are vertically spaced.

Throughout the middle portion of the chassis, the plates 60 are rigidly spaced apart by the cross members 73 which are joined to the side plate members 60 and cross each other diagonally to provide a rigid X-shaped construction. Also there is provided a transverse angular shaped member 74 which extends across the ends of the plates 73 and is joined to the side plate member 60.

The forward ends of the side plate member 60 are provided with castings 75 rigidly secured thereto, the under surface of the casting 75 providing pads for supporting this end of the chassis rigidly on the axle housing 32 as shown in detail in Figure 3. The castings 75 are also provided with forwardly extending projection 76 terminating in collar portions 77 through which the transverse shaft 26 extends, this shaft being provided with the bushings 78 forming the pivotal supports for the lower ends of the uprights 5.

Considering now the manner in which the power unit is supported in the chassis, it will be seen that the radiator 53 is supported by means of the brackets 79 upon the supports 80, welded or otherwise suitably secured to the frame plate portion 62. The transverse member 65 provides the support for the steering axle, and forwardly thereof supported on brackets 80' is a plate 81 forming a support for the front end of the engine, as shown in detail in Figure 4, the engine brackets being indicated at 82'. The plate 81 has a dropped central portion and in the downwardly inclined arms, there is provided openings 82 through which extend suitable securing means for the engine brackets 82'. The rear end of the engine is suitably supported by means of an arched plate member 83 which at its ends is provided with the normally directed plan portions 84, bolted or otherwise suitably secured to the side frame members 60. The plate member 83 is arched over the flywheel housing of the engine and at the sides of the housing is provided with angle-shaped brackets 85, which bolt to corresponding bosses formed in the sides of the flywheel housing as shown clearly in Figure 5. This forms a rigid support for the flywheel housing and consequently for the rear end of the engine and the transmission 48.

The side frame member 60 forwardly of the service brake 86, mounted on the output shaft of the transmission is provided with an angle-shaped transverse supporting member 87, which is bolted or otherwise secured by means of the brackets 88 to the inner surfaces of the side frame plates 60. The member 87 as shown in Figure 3 is provided with the projecting brackets 89, forming the pivotal supports for the ends 29 of the tilt cylinders 28, whereby these tilt cylinders are pivoted to the chassis for swinging movement in accordance with the movement of the uprights 5. The propeller shaft 90 from the transmission to the drive axle extends between the transverse member 87 and the lower transverse member 74 of the chassis. The member 87 also provides suitable pivotal support for the clutch pedal 92 and the brake pedal 93, the brake pedal operating through a suitable master cylinder 94 supported on the bracket 95 for hydraulic control of conventional type hydraulic brakes at the wheels.

Forwardly of the transverse member 87 there is provided the stiffening member 96, also suitably bolted to the side frame member as by means of the brackets 97. This member is disposed adjacent the forward ends of the side frame members 60 to provide reinforcement adjacent the point at which the side frame members are adjacent the stiffening member 64.

As shown in Figures 5 and 6, the vertically extending angle members 63 at the rear end of the vehicle are provided at their upper ends with means for securing the longitudinal frame members or bars 98 thereto. These members 98 extend rearwardly to a point adjacent 99, thence extend downwardly to the upper edge of the side frame member 60 rearwardly of the transverse arched member 83 and preferably are supported upon the reinforcing plates 69 in suitable manner.

The members 98 form supporting means for the hood 37 and for the side enclosures 100, which laterally enclose the engine between the fenders 34. At their forward ends, indicated at 99, the members extend vertically downwardly and form a support for the liquid sump or reservoir 102, which is disposed transversely across the vehicle beneath the knees of the driver, in which there is conveniently located without in any way interfering with the operation of the vehicle. Intermediate their ends, the members 98 are provided with reinforcing struts 103, which also serve as lateral reinforcements for the side enclosing members.

Considering now in detail Figures 8 and 9, which illustrate the steering axle construction, the axle assembly 68 is similar to a conventional steering axle of a motor truck, except that it is provided with the pivot means 67 mounting it for rocking movement intermediate its ends about the transverse frame plates 65. The axle portion of the axle 68 terminates in forged ends 105 adapted to receive the spindle members 106 mounted thereon as by means of king pins 107, the spindle members 106 and suitable spindle portions 108, upon which the steering wheels 109 are rotatably mounted. Preferably the two spindles 106 are tied together by the tie rod 110 extending between suitable tie rod arms 112 carried by the spindles, and one of the spindles is also provided with the starting arm 113 suitably connected to a reach rod controlled by steering wheel 43 for simultaneously steering the two spindles 106.

To absorb torque reactions, there is provided a wish-bone type reinforcement for the steering axle, consisting of the two rods 114 and 115, which are disposed between the converging ends 62 of the chassis and are bolted at their ends to the axle 68 at points spaced on opposite sides of pivot portion 67. The opposite ends of the rods 114 converge toward each other and are anchored on a bracket 115 suitably secured to the cross member 70 of the chassis providing against tortional reactions in the axle disturbing its pivot mounting. Preferably the rods 114 are universally supported in the bracket 115 to accommodate the rocking movement of the axle, produced by pivoting it intermediate its ends.

It will be apparent from this construction that the steering axle can rock about its center in a vertical plane but is restrained from horizontal rocking by reason of the wish-bone construction, although this construction accommodates the vertical rocking movement of the axle. By reason of this construction, it is apparent that the vehicle has in effect a three-point suspension, so that it will be stable in all positions regardless of the ground levels in which the wheels 33 may rest.

Considering now the drive axle assembly shown in Figures 10 and 11, this axle is of the same type as is used commercially in automotive trucks, consisting of an axle housing 32, preferably formed as described in Spatta Patent No. 2,124,406 of July 19, 1938. This housing includes a central banjo portion 116 adapted to contain the differential ring gear 117 and a driving pinion 118 or a driving ring gear of the differential. The housing terminates at its ends in suitable wheel bearing portions for mounting a pair of dual wheels 30 thereon, the wheels being mounted as described in Burger Reissue Patent No. 20,022 of June 30, 1936. The side of the housing adjacent the uprights 5 is provided with a cover plate 119 suitably secured as by the bolts 120 to the flange 122 of the housing. The housing arm extending from this banjo portion is provided with a spring pad 122, upon which is bolted the bracket 75 for mounting the forward end of the chassis upon the housing.

Extending from the transmission side of the housing toward the transmission is a differential carrier 123 having a dropped gear portion 124 providing a reduction between the propeller shaft 90 and the differential pinion. This gear is indicated diagrammatically in Figure 10 at 125 and 126, respectively, the gear 125 being driven from the propeller shaft 90 driving the gear 126, which in turn is mounted on the pinion shaft which drives the differential ring gear.

The counterweight construction mounted at the rear end of the vehicle upon the steering axle 68 is shown in detail in Figures 12 and 13 and consists of a first mounting plate portion 130, preferably formed as a casting and provided with a recess or opening 132, therein through which are extended the vertical bars 133 forming a grill for protecting the radiator 53. Adaptable to be bolted to the plate 130 is a second counterweight member 134, also formed as a casting and which progressively increases in thickness toward its lower ends. The plate 130, together with the plate 134 are adaptable to be bolted to a supporting plate 135 carried by frame members 63 and 64. Suitable openings 136 are provided for receiving the bolts by which these two castings are secured to the end of the frame. Each of the plates 130 and 134 is also provided with wing portions 137, which extend laterally outwardly and downwardly, as shown in Figures 1 and 2, providing both protection for the rear end of the truck and also increasing the weight to provide sufficient counterbalance for the loads carried upon the forks 15. If it is desired to provide more counterbalancing weight than is provided by 137 and 134, an additional counterweight 138 may be attached to the plate 134 as indicated in Figure 13. The counterweight 138 is preferably provided with vertically spaced forwardly extending projections 139 and 140, adapted to extend over the rearward projections 142 and 143 of the plate 134. These two projections 142 and 143 are provided with aligned openings 145 and 146, respectively, which when the openings 147 and 148 or the projections 139 and 140 of the counterweight 138 are aligned therewith receive a lock pin 150 for locking the additional counterweight in position. This additional counterweight is thereby clamped in position over the outer surface of the counterweight 134 and adds additional counter bearing force if greater loads are to be carried upon the forks 15.

In Figures 14 and 15, I have disclosed the hydraulic system for this truck, which includes the pump 55, consistently driven by the motor 52. The inlet to the pump 55 consists of a conduit 150, leading from the bottom 152 of the oiler, sump, or reservoir 102 for directing fluid from this reservoir to the inlet side of the pump. The outlet side of the pump or high pressure side is connected to a conduit 153 leading to a series of available bosses generally indicated at 154. When the control members 45 and 46 are in neutral position, the oil pressure delivered by the pump 55 passes through the available boss 154 and thence through the by-pass conduit 155 and ends up at 156 of the reservoir 102. However, when one of the control levers 145 is actuated, for example, the tilting control lever, oil is passed from the valve boss 154 through the line 157 to the conduit 158 interconnecting the forward ends of the tilt cylinders 28. This causes the piston rods 26 to move rearwardly, tilting the uprights 5, for moving them rearward into transporting position. When this control 46 is moved in the opposite direction, the line 157 is connected to the by-pass line 155, but fluid from the high pressure side of the pump is directed into the line 159 which through the connection 160, leads to a T 162, having communications through conduit 163 with the rear ends of the tilt cylinders 128, thereby tilting the upright assembly forwardly to pick up or discharge a load from the forks 15.

If the control lever 46 is actuated, the fluid under pressure from the high pressure side 153 of the pump is continued through conduit 164 to the lower end 165 of the vertical cylinder 23 controlling the raising and lowering of the uprights. This produces upward movement of the piston rod 10, thereby raising the forks and also producing telescopic movement of the upright. The return of the upright assembly to lowered position is by gravity, in which case the conduit 164 is connected through at valve boss 154 to the alignment 155 leading to the reservoir.

The upper end of the cylinder 23 is provided with line 166 which returns any oil by-passing in the piston therein back to the reservoir as shown in Figure 14.

In Figure 7 there is disclosed a more or less diagrammatic view of the rear side of the upright assembly, illustrating the manner in which the two outer uprights 5 are securely held against relative lateral movement by means of the cross members 24, 26, and 27, also because of the height of the lifting mechanism, these uprights are also supported against relative vertical movement by cross bracing rods 170 and 172, extending between the cross member 6 and the transverse chain anchor and cylinder support 22, as well as by means of cross braces 173 and 174 between member 22 and the top cross member 7. This provides a very rigid and sturdy upright construction in which the uprights will be maintained in positive alignment so as to prevent any possibility of binding of the inner slides 8 during the telescoping movement.

In Figures 16 and 17 we have disclosed a modified type of counterweight arrangement in which in place of adding additional metal members, the outer counterweight plate is provided with a hinged stand upon which additional men may support themselves to add their weight to the rear end of the vehicle when heavier loads are to be carried. This stand is arranged to be locked in folded position out of the way when not in use.

Considering these figures in detail, the rear counterweight member 134' is provided adjacent its lower end with brackets 175 folded or otherwise secured to the face thereof and having offset arms 176 carrying a vertically extending bolt or rod 177. One such bracket is provided at each side of the counterweight member adjacent its lower end and the rods 177 are adapted to act as guides for receiving the collar portion 178 which is vertically slidable on the rods 177 and is provided with a hinge portion 179 upon which the frame 180 of the stand is hinged. The frame 180 is formed of angle iron members and across its lowered flange surface there is provided an extended metal grill, which forms the support for the men to stand on.

At the upper portion of the counterweight member 134 there is provided a second bracket member 183 which is bolted or otherwise secured to the outer surface of the plate member 134' and has welded or otherwise secured thereto, a supporting bar 184 which can be used as a hand hold by the men standing on the platform and which also at its ends is provided with the eye portion 185, forming an anchor for the chains 186. Two such chains are provided, one on each side of the stand 180 and hold the stand in horizontal position as shown in Figure 16 when in use.

When it is desired not to use the stand 180, it is folded up into the dotted line position shown in Figure 16 and is also raised, the collar portion 178 moving to the upper ends of the rods 177. In order to lock the stand in this position, the right hand bracket 183 at the upper portion of the counterweight member is provided with an offset latch member 187 which has the slot 188 into which the edge 189 of the stand extends. This edge is apertured as indicated at 190 and is locked in position in the slot 188 by means of a pin 192 chained to the bracket or latch 187. This securely latches the stand in raised position, parallel to the plate 134' holding it out of the way when not in use. Because of the expanded metal platform forming the standing portion of the stand when in the raised position, this provides a clear opening to the grill 132 of the counterweight members so that air may readily flow to the radiator of the engine. Thus a simplified means is provided for adding additional weight to the rear end of the vehicle without the necessity of carrying a bulky counterweight member such as the member 138.

Industrial trucks of this type are sometimes required to be flown by plane to any accessible location and for this reason it is necessary that some provision be made to accommodate moving this kind of truck into the fuselage of the plane. For this reason the upper construction as shown in Figure 3 is arranged for detachment and the hydraulic hose connection and the wiring connection are also detachable so that the entire upper assembly may be moved in order to disassemble it for position within a plane for transportation to remote places. This also is a reason for providing in place of the bulky counterweight 138 the expedient shown in Figures 16 and 17.

Also due to the fact that the vehicle lifts to extremely high positions, it is desirable to afford additional protection to the operator when the load is in elevated position. This is especially true with bulky light loads and for this reason the fingers 15 of the lift mechanism are provided with vertically extended strap portions 195 for additional support of bulky loads to prevent them toppling rearwardly over the forks when in elevated position.

It is therefore believed apparent that we have provided a novel type of industrial truck particularly adaptable to the loading of cargo planes and transports, which is designed for travel on landing strips and airfields and has a road clearance sufficient to accommodate its operation in practically all types of weather. In addition, the lateral stability of the mechanism insures its safe operation even when the loads are lifted to the maximum height capable of being produced by the truck.

In conjunction with this design, it is apparent that we have been able to incorporate certain features of construction which will render it economical in cost and assembly as well as allowing ready maintenance because of the accessibility of the parts and the fact that a major portion of the parts are of standard automotive construction.

We do not intend to be limited to the exact details herein shown and described but only insofar as are defined by the appended claims.

We claim:

1. In an industrial truck, a vehicle body including a chassis and a power unit, a drive axle for said truck including a banjo type axle housing, means for supporting one end of said chassis directly on the oppositely extending arms of said housing, a transverse brace in said chassis intermediate said power unit and said axle a transverse shaft rigidly supported from said chassis beyond said housing, a vertical load carrying mast assembly pivotally mounted adjacent its lower end about said shaft, and laterally spaced tilt means for said mast assembly anchored at one end in spaced relation on said transverse brace.

2. An industrial truck chassis including parallel side frame members, cross bracing therebetween at longitudinally spaced points, a vertical mast pivotally connected to one end of said chassis, means pivotally anchored to said bracing and connected to said mast for controlling tilting thereof, transverse plate means adjacent the opposite end of said chassis, a steering axle pivotally mounted at its center to said plate means for vertical rocking movement, and a drive axle assembly adjacent said mast and rigidly connected to said chassis.

3. The chassis of claim 2 wherein said axles are provided at their ends with interchangeable pneumatic tires.

4. An industrial truck chassis comprising parallel side frame members, transverse parallel plate means adjacent one end of said chassis, a steering axle beneath said chassis supporting said end thereof, vertically extending posts at said end of said chassis, a first counterweight member supported on said posts and chassis end, and a second detachable counterweight member secured over said first member and having angularly extending wing portions partially overlying the longitudinal projection of the wheels on said axle.

5. The chassis of claim 4 further characterized by means providing a rectangular grill opening through said members.

6. The chassis of claim 4 further characterized by the provision of an additional counterweight block, and means detachably supporting said block in a rearwardly projecting position on the lower portion of said second counterweight member.

7. In an industrial truck, a chassis having a power unit mounted thereon and having a driving axle under one end and a steering axle under the opposite end, a vertically extensible load-carrying mast pivotally mounted on said chassis adjacent said driving axle, counterweight means secured across the opposite end of said chassis, and platform means carried by and arranged to be moved into horizontal position projecting from said counterweight means for supporting additional counterbalancing weight.

8. The truck of claim 7 wherein said platform means when not in use is adapted to be moved into vertical locked position on the rear face of said counterweight means.

9. In an industrial fork truck having a load-carrying mast at one end, fixed counterweight means at the other end, a platform hinged on the rear face of said counterweight means and movable into horizontal rearwardly projecting position for supporting additional counterbalancing weight, and means for locking said platform in vertical position against the rear face of said counterweight means.

10. A frame for an industrial truck comprising laterally spaced parallel vertical plate members having inwardly offset parallel portions at one end thereof, an end pate extending transversely between the ends of said offset portions, reinforcing gusset members in the angles formed by said offset portions, a transverse brace between the gussets on the inner faces of said plates, a pair of vertical transverse plates between said offset portions having downwardly arched central portions providing a pivot for a steering axle, engine receiving supports carried between said offset portions, and pad means on the opposite ends of said frame plates for supporting the same on the arm portions of an axle housing.

11. The frame of claim 10 wherein said pad means includes forwardly projecting shaft supports for receiving a transverse upright-supporting shaft.

12. The frame of claim 10 including diagonal cross bracing between the lower edges of said plate members intermediate said inwardly offset portions and said pad means.

13. The frame of claim 10 including additional transverse bracing between said plate members adjacent the upper and lower edges thereof beyond said inwardly offset portions.

ELMER J. DUNHAM.
KENNETH E. MULVANY.